(12) United States Patent
Dierk et al.

(10) Patent No.: US 10,990,185 B2
(45) Date of Patent: Apr. 27, 2021

(54) SMART HAT DEVICE FOR INTERACTING WITH REMOTE DEVICES AND DISPLAYS

(71) Applicant: FUJI XEROX CO., LTD., Tokyo (JP)

(72) Inventors: Christine Marie Dierk, Berkeley, CA (US); Scott Carter, Menlo Park, CA (US); Patrick Chiu, Mountain View, CA (US); Anthony Dunnigan, Palo Alto, CA (US); Chelhwon Kim, Palo Alto, CA (US); Donald Kimber, Foster City, CA (US); Nami Tokunaga, Cupertino, CA (US); Hajime Ueno, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 38 days.

(21) Appl. No.: 16/149,000

(22) Filed: Oct. 1, 2018

(65) Prior Publication Data
US 2020/0103976 A1  Apr. 2, 2020

(51) Int. Cl.
| | |
|---|---|
| *G06F 3/01* | (2006.01) |
| *A42B 1/006* | (2021.01) |
| *A42B 1/02* | (2006.01) |
| *A42B 1/22* | (2006.01) |
| *G06F 3/044* | (2006.01) |

(52) U.S. Cl.
CPC .............. *G06F 3/017* (2013.01); *A42B 1/006* (2013.01); *A42B 1/02* (2013.01); *A42B 1/22* (2013.01); *G06F 3/044* (2013.01)

(58) Field of Classification Search
None
See application file for complete search history.

(56) References Cited

U.S. PATENT DOCUMENTS

| | | |
|---|---|---|
| 6,721,962 B1 | 4/2004 | Polaire |
| 6,935,761 B2 | 8/2005 | Vanderschuit |
| 7,598,928 B1 | 10/2009 | Buskop |
| D603,585 S | 11/2009 | Capriola |
| 8,008,564 B2 | 8/2011 | Wilens |
| D751,795 S | 3/2016 | Zenoff |
| D754,422 S | 4/2016 | Zenoff |
| D764,771 S | 8/2016 | Zenoff |
| D811,056 S | 2/2018 | Zenoff |

(Continued)

OTHER PUBLICATIONS

Profita, H. P., et al., Lightwear: An Exploration in Wearable Light Therapy, In Proceedings of the Ninth International Conference on Tangible, Embedded, and Embodied Interaction, TEI '15, Jan. 15-19, 2015, Stanford, California, 321-328 pgs.

(Continued)

*Primary Examiner* — Stephen T. Reed
(74) *Attorney, Agent, or Firm* — Procopio, Cory, Hargreaves & Savitch LLP (57) ABSTRACT

In example implementations described herein, there is a smart hat that is configured to receive gesture inputs through an accelerometer or through touch events on the hat, with light emitting diodes providing feedback to the wearer. The smart hat can be configured to be connected wirelessly to an external apparatus to control the apparatus by transmitting and receiving messages (e.g., commands) between the hat and the apparatus wirelessly. Further, a network of smart hats may be managed by an external device depending on the desired implementation.

24 Claims, 10 Drawing Sheets

(56) References Cited

U.S. PATENT DOCUMENTS

2010/0313334 A1    12/2010  Moy
2011/0122601 A1*    5/2011  Waters ................... A42B 1/244
                                                    362/106
2013/0198935 A1*    8/2013  Waters ..................... A42C 5/00
                                                    2/209.13
2015/0221244 A1*    8/2015  Miller .................. G06Q 30/018
                                                    705/310
2018/0260052 A1*    9/2018  Karagozler ............ D02G 3/441
2018/0376586 A1*   12/2018  Longinotti-Buitoni ......................
                                                    D06M 23/16

OTHER PUBLICATIONS

SmartCap Technologies, 2018, [online], 7 pgs. URL: http://www.smartcaptech.com/.

ZEROi: Smart Hat with Bone Conduction Technology, 2017, [online] 30 pgs. URL: https://www.kickstarter.com/projects/781010162/cap-on-sound-on.

Dierk, C., et al., AlterWear: Battery-Free Wearable Displays for Opportunistic Interactions, In Proceedings of the 2018 CHI Conference on Human Factors in Computing Systems, Apr. 21-26, 2018, Montreal, QC, Canada, pp. 220:1-220:11.

Lumahelm—An Interactive Helmet, URL: https://www.youtube.com/watch?v=BruSCEzv4uQ—2013.

* cited by examiner

SMART HAT DEVICE FOR INTERACTING WITH REMOTE DEVICES AND DISPLAYS

BACKGROUND

Field

The present disclosure is generally related to wearable devices, and more specifically, to a smart hat device configured to interact with remote devices and displays.

Related Art

Wearable devices capable of detecting user gestures and providing interactive feedback have been developed in the related art. However, many head-mounted devices (e.g., glasses, larger Augmented Reality (AR) and Virtual Reality (VR) headsets and devices) have a form factor that limits their diffusion in the marketplace.

SUMMARY

Augmenting everyday wearables can address the issues with diffusion in the related art. In example implementations described herein, there is a wearable device in the form of a hat, which can be used as a wireless remote controller for interactive systems including displays, mobile devices, and smart appliances. The device can furthermore communicate information peripherally both to the wearer and to collaborators.

Aspects of the present disclosure can include a hat, which involves a brim having disposed on an underside of the brim a set of light emitting diodes (LEDs) oriented to illuminate at least a portion of the bottom portion of the brim; a wireless network interface, and a microcontroller, configured to, for receipt of a message over the wireless network interface, configure the set of LEDs to illuminate according to at least one of a corresponding color, a brightness, or a pattern based on the message.

Aspects of the present disclosure can further include a system, which involves an apparatus, and a hat connected wirelessly to the apparatus, the hat involving a brim having disposed on an underside of the brim a set of light emitting diodes (LEDs) oriented to illuminate at least a portion of the bottom portion of the brim; a wireless network interface configured to connect the hat to the apparatus, and a microcontroller, configured to for receipt of a message over the wireless network interface from the apparatus, configure the set of LEDs to illuminate according to at least one of a corresponding color, a brightness, or a pattern based on the message.

Aspects of the present disclosure can further include a system, which involves an apparatus, and multiple hats connected wirelessly to the apparatus, each of the multiple hats involving a brim having disposed on an underside of the brim a set of light emitting diodes (LEDs) oriented to illuminate at least a portion of the bottom portion of the brim; a wireless network interface configured to connect the hat to the apparatus, and a microcontroller, configured to for receipt of a message over the wireless network interface from the apparatus, configure the set of LEDs to illuminate according to at least one of a corresponding color, a brightness, or a pattern based on the message. In such a system, each of the multiple hats may have LED sets on the top portion of the crown so that wearers interacting with other wearers can view the LED sets of other wearers. Messages transmitted to the hats can cause the LED sets on the crown to light up according to at least one of a corresponding color, a brightness, or a pattern based on the message, so as to provide a status of a particular wearer or for other purposes in accordance with the desired implementation.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
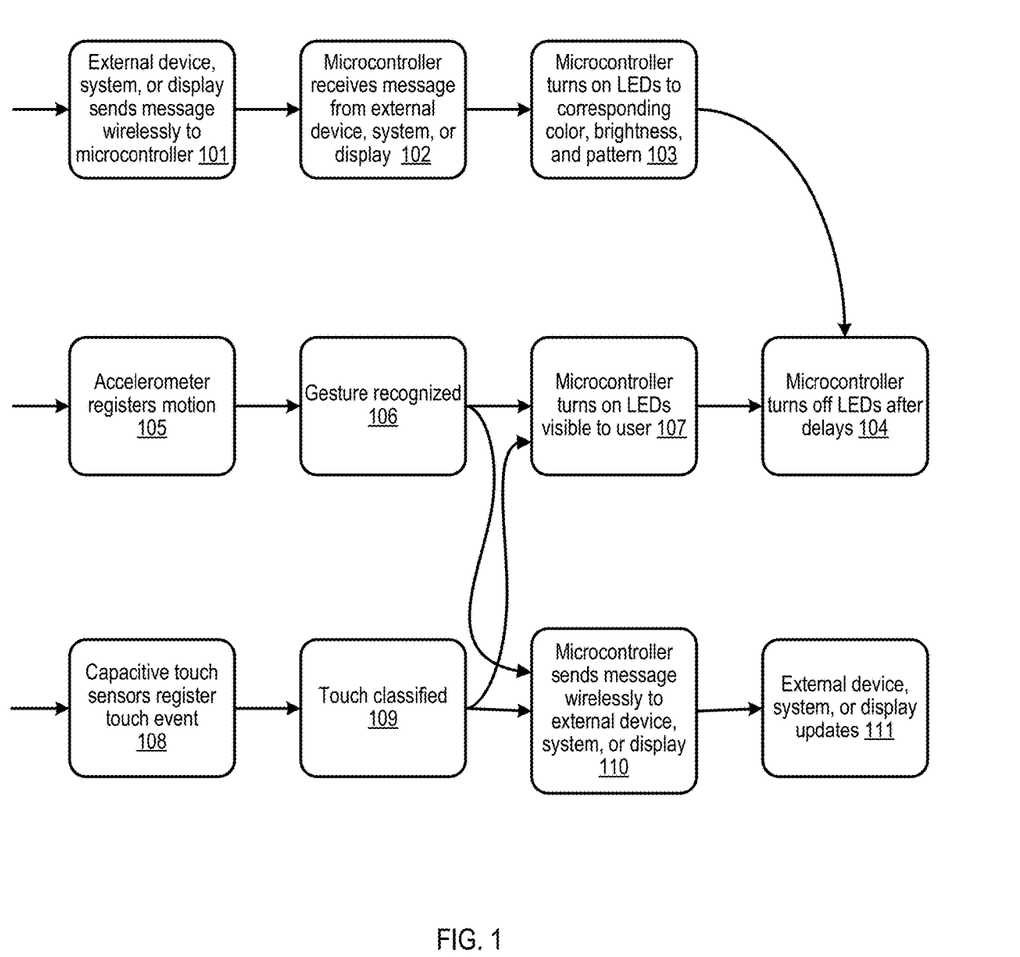
FIG. 1 illustrates an example flow diagram for the smart hat, in accordance with an example implementation.

FIG. 1 illustrates an example flow diagram for the smart hat, in accordance with an example implementation. As illustrated in FIG. 1, the smart hat can facilitate several functions utilizing a microcontroller, an accelerometer, and a touch sensor (e.g., capacitive touch sensor.) Embedded Light Emitting Diodes (LEDs) might turn on or off after gestures are recognized depending on the application instance.

For example, the smart hat interacts with an external device, system, or display that sends a message wirelessly to the microcontroller of the smart hat at 101. At 102, the microcontroller receives and processes the message from the external device display or system. At 103, the microcontroller turns on the light emitting diodes (LEDs) to the corresponding color, brightness, and/or pattern that is associated with the received message. At 104, the microcontroller turns of the LEDs after some preset time delay. The LEDs can also be turned off by the microcontroller in response to a gesture or touch as detected by the touch sensors or the accelerometer, in accordance with the desired implementation.

In an example flow involving an accelerometer embedded into the smart hat, at 105, the accelerometer can register a motion, and at 106 the microcontroller can be configured to recognize a gesture based on measurements from the accelerometer. In this example implementation, the microcontroller can activate LEDs that are visible to the user (e.g., under the brim, under the crown in front of the hat, etc.) to alert the user that the gesture has been recognized, whereupon the flow proceeds to 104 to turn off the LEDs after some preset time delay. In conjunction with the recognized gesture 106, the flow can proceed to 110 if the gesture is directed to an interaction with an external device, system, or display. In such an example implementation, the microcontroller sends a message directed to the interaction wirelessly to the external device, system, or display at 110, whereupon the external device, system, or display receives the message and conducts updates corresponding to the message at 111.

In an example flow involving capacitive touch sensors embedded in the hat, at 108, the capacitive touch sensors register the touch event. At 109, the microcontroller classifies the touch and determines the course of action. If the touch is directed to an interaction with an external device, system, or display, then the flow proceeds to 110 and 111. In conjunction with such an interaction, the flow also proceeds to 107 and 104 as shown in FIG. 1.

Example implementations described herein involve a hat platform that is configured to provide: 1) an ambient display that can show information to other people; 2) a separate ambient display to show content to the user; 3) head gesture sensing; and 4) touch input sensing. Such features can be combined to facilitate a variety of different use cases, in accordance with the desired implementation.

In an example implementation as described herein, the smart hat is configured with an ambient hat-worn visual display that is visible to other people. Hats provide an unexpectedly useful substrate for wearable displays for two reasons: 1) much of the hat is not visible to the wearer at all and only visible to others, and 2) a small portion of the hat (e.g., the underside of the brim) is constantly visible in the peripheral vision of the wearer. In view of such unexpected advantages of hats, the first aspect can be utilized to facilitate an ambient hat-worn visual display that is visible to others. While related art implementations have involved externally-facing hat-worn displays as a form of personal expression, in the present disclosure, LEDs are mounted on the crown to communicate information (for instance interruptibility) to onlookers. Information can be communicated through modulation of the LEDs color, brightness, and flashing pattern in accordance with a desired implementation. Additionally, the hat is configured to facilitate a purposefully ambient, low-fidelity display.

Figure 2:
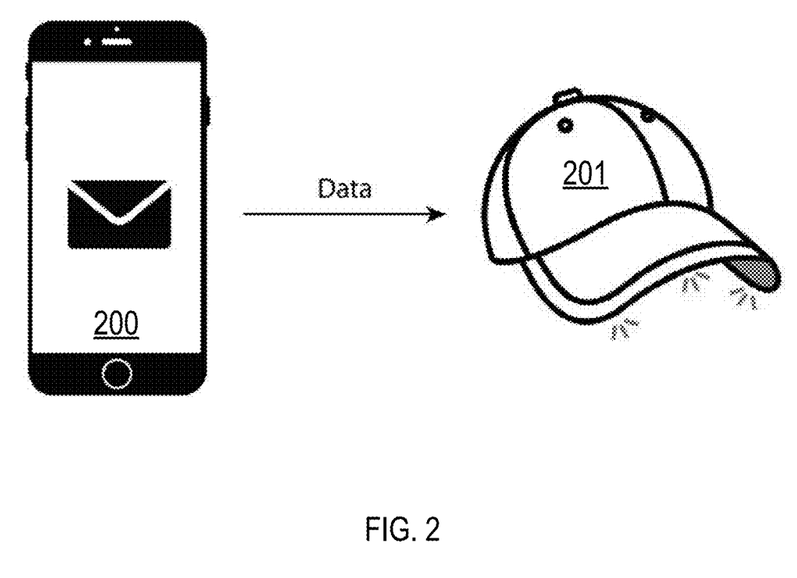
FIG. 2 illustrates an example implementation of a mobile device interaction with the smart hat, in accordance with an example implementation.
Figure 3:
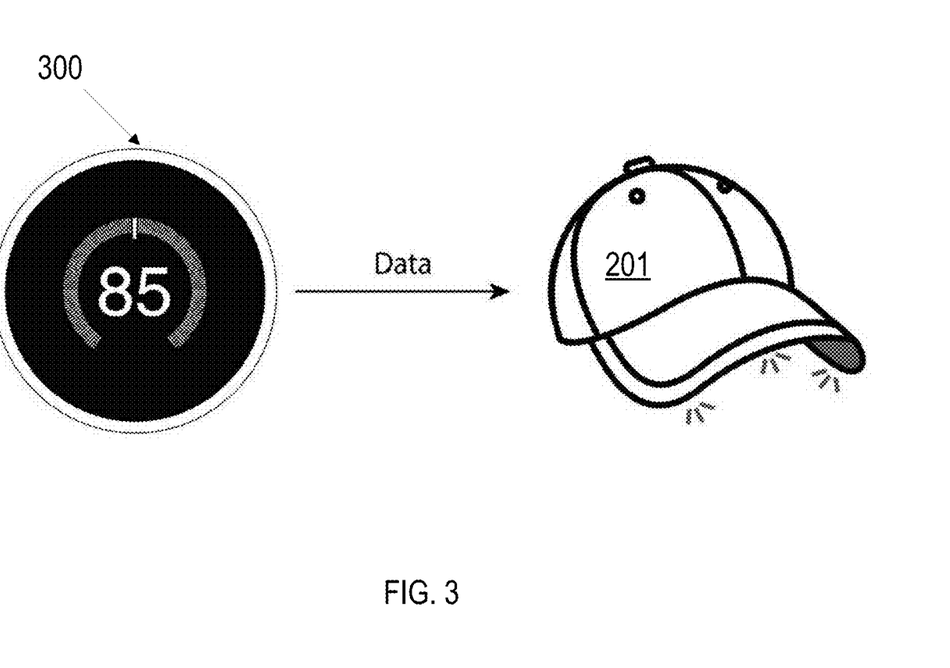
FIG. 3 illustrates an example implementation of an internet of things (IoT) device interaction with the smart hat, in accordance with an example implementation.
Figure 6A:
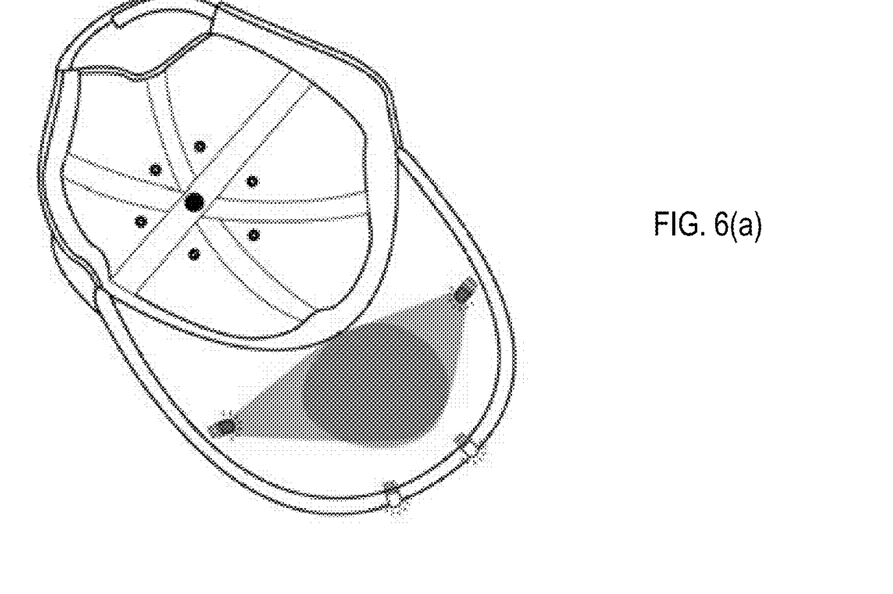
FIGS. 6(a) and 6(b) illustrate an example configuration of ambient output modalities, in accordance with an example implementation.
Figure 6B:
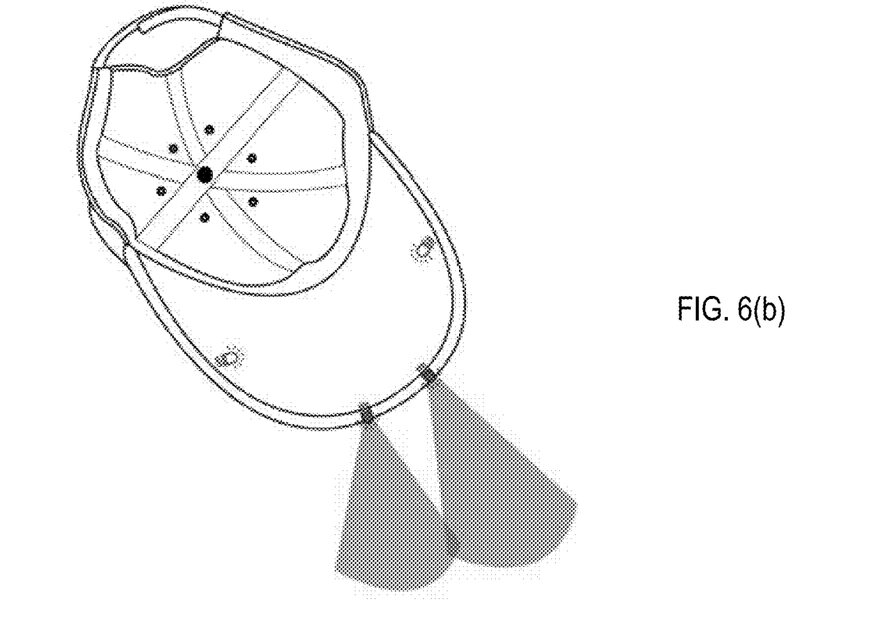

In the second aspect, the ambient hat-worn visual display is visible to the wearer themselves, in that a small portion of the hat is constantly visible in the wearers peripheral vision. In an example implementation, the underside of the brim is equipped with two sets of LEDs. In such an example implementation, the first set is located on the sides of the brim and angled towards the middle of the brim such that light from the LEDs is projected onto the entire surface as illustrated in FIGS. 6(*a*) and 6(*b*). Such LEDs can provide ambient notifications to the wearer: for instance, turning blue to indicate a new text message on a wirelessly connected phone, and flashing red to indicate their wirelessly connected thermostat has been set above a preset threshold depending on the desired implementation and as illustrated in FIGS. 2 and 3. The second set of LEDs can be situated at the front of the brim and outward facing. Such LEDs can be used as a head-mounted flashlight as well as for ambient notifications. Rather than illuminating the underside of the brim, these LEDs project light in front of the user and onto their workstation. Both sets of LEDs convey different types of information by modulating the LEDs color, brightness, and flashing pattern. In addition, the LEDs on the front of the hat use pulse width modulation to communicate user identity to these external devices.

FIG. 2 illustrates an example implementation of a mobile device interaction with the smart hat, in accordance with an example implementation. In an example implementation, the mobile device 200 and smart hat 201 are connected to each other wirelessly. In an example interaction, a new message received on a connected mobile device 200 can trigger an ambient LED notification on the smart hat 201, which can lit up in a preset color (e.g., blue) to indicate that a new text message has been received as illustrated in FIG. 2.

FIG. 3 illustrates an example implementation of an internet of things (IoT) device interaction with the smart hat, in accordance with an example implementation. In this example implementation, the IoT device is in the form of a thermostat 300, however, any IoT device can be utilized in accordance with the desired implementation. In the example implementation illustrated in FIG. 3, rising temperatures measured by a wirelessly connected thermostat trigger 300 trigger an ambient LED notification on the smart hat 201 which can be lit up in a preset color (e.g., red) to indicate that the temperature has exceeded a previously set threshold as illustrated in FIG. 3.

Figure 4A:
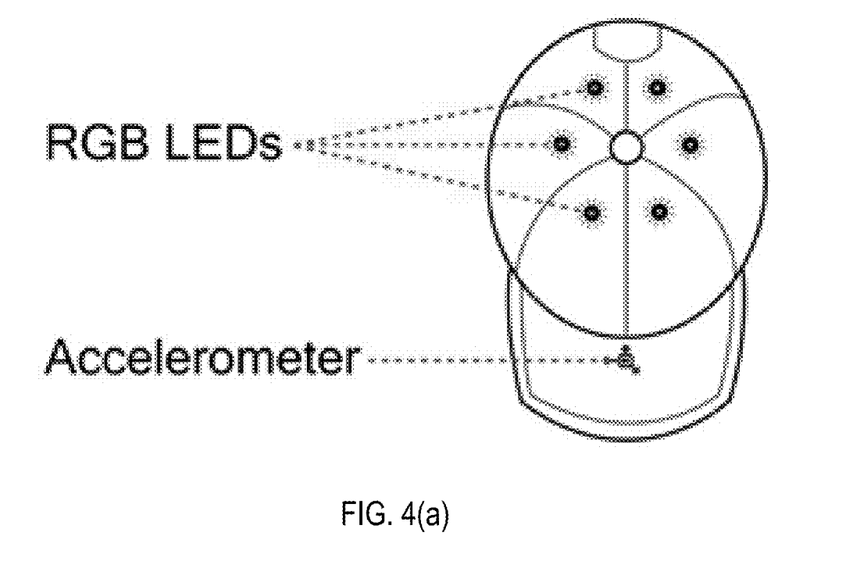
FIGS. 4(a) and 4(b) illustrate a diagram of the smart hat, in accordance with an example implementation.
Figure 4B:
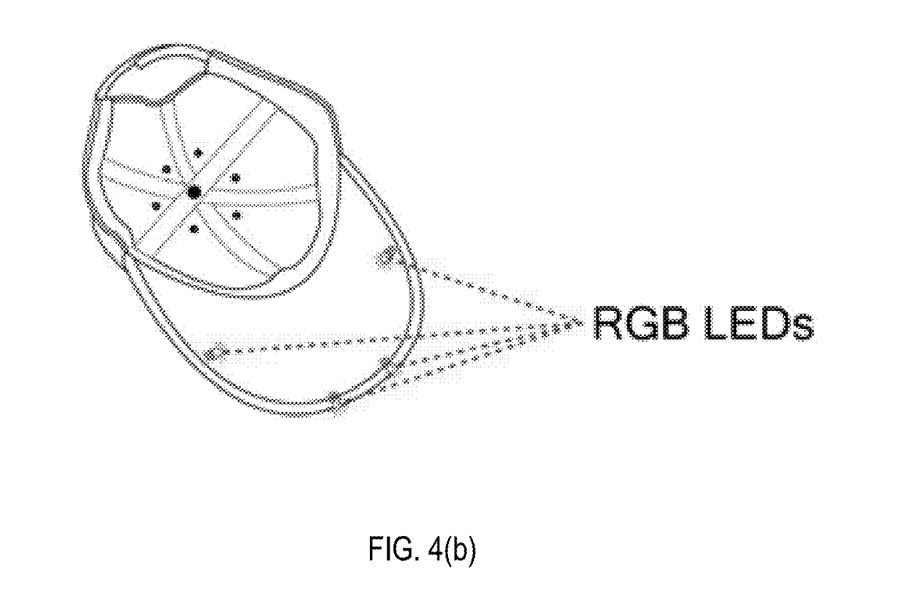

In an example implementation, the smart hat is equipped with a sensor for detecting head movements and gesture. Hats provide a unique location for gesture sensing as the head is an expressive part of the body. In many cultures, people may nod or shake their head to express approval or otherwise. Head orientation can also indicate objects of interest, as well as act as a rough measure of attention. While some related art head-worn devices are capable of detecting head movements and gestures, no such sensing has been incorporated in a hat form factor. The device presented in example implementations includes an accelerometer for detecting head movements and gestures such as shaking the head, nodding the head, and looking in specific directions as illustrated in FIG. 4. Additionally, such movements and gestures are communicated to external displays and devices, rather than being used internally.

Figure 5A:
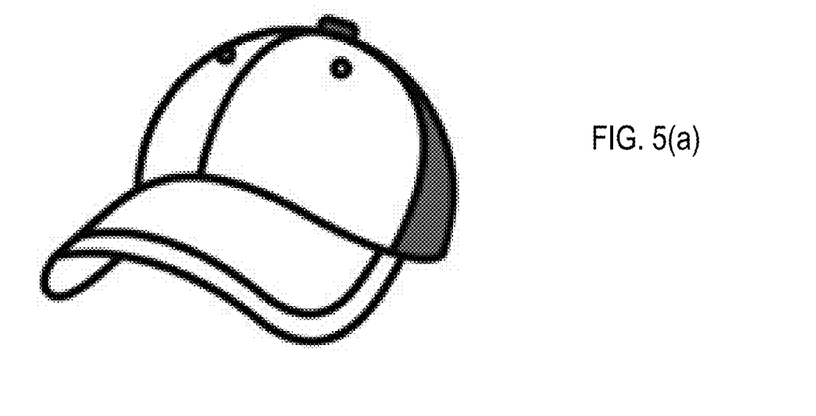
FIGS. 5(a) to 5(c) illustrate examples of touch sensitive areas of the smart hat, in accordance with an example implementation.
Figure 5B:
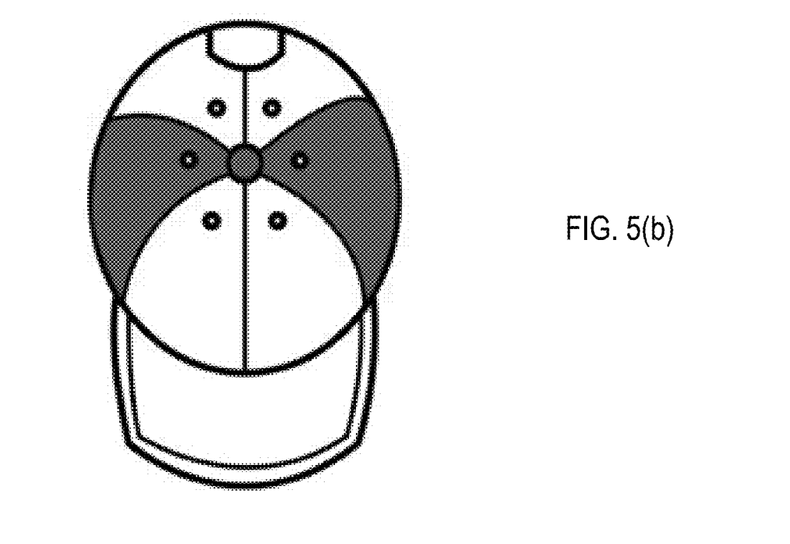
Figure 5C:
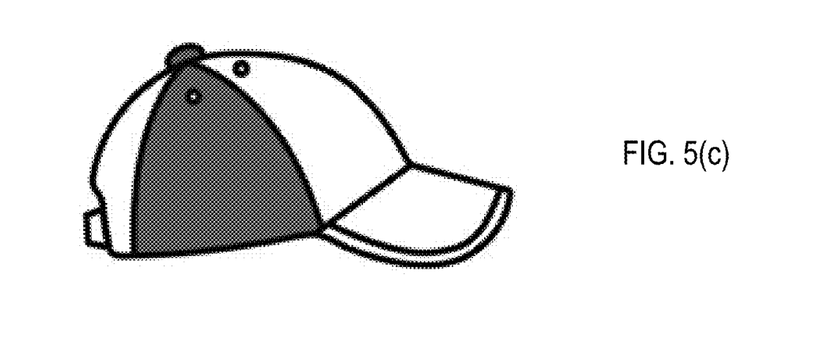

In another example implementation as described herein, the smart hat can be utilized as a touch input device. In addition to implementing gesture detection for head movements, capacitive touch sensing can be implemented, for example, on the left and right sides of the crown as illustrated in FIG. 5. Such portions of the hat are capable of detecting taps, presses (in which the touch is held for a period of time), and swipes in four directions (up, down, left, right). The button on top of the cap is touch sensitive as well, and can be utilized for detecting taps and presses. As an additional form of input, the accelerometer is also capable of detecting gestures with the hat, such as lifting it off the head, turning it on the head, and taps on the brim.

In another example implementation, the head of the wearer may be utilized as a touch input surface. Though example implementations detect touches and gestures on the surface of a hat, many of these gestures could be performed directly on the surface of the head and detected using implemented gloves or other wearable devices in conjunction with the hat. Thus, in example implementations, there can also be smart gloves or other wearable devices operating in conjunction with the smart hat that are configured to detect taps, presses, and swipes in four directions (left, right, up, down) on the surface of the head.

In another example implementation, the hat is utilized as a remote controller for external displays and devices. Such functionality is facilitated through embedded wireless connectivity. Rather than being self-contained, head movements, gestures, and touch interactions can be communicated using a wireless protocol (e.g., Bluetooth, NFC, ultrasonic, etc.) In such implementations, the hat can be used as a remote controller for a number of systems including external displays, mobile devices, and IoT devices. Additionally, the LEDs can be controlled via wireless communication, for instance notifying the wearer of various events/messages, or acting as an additional output for an external display. Such implementations can facilitate several applications, examples of which are described below.

In an example implementation, the smart hat is configured to interact with other smart devices in a room and operate as device control. As more smart devices are installed in more buildings, there is a need for users to have access to simple tools to control them. The sensors and input/output (I/O) features of the smart hat can provide such control. For example, a smart hat can facilitate a user to simply look at a thermostat on a distant wall and change its temperature setting with a swipe along one of the interactive surfaces of the hat. Changes to the LED notification system of the hat during the interaction (e.g. red to blue, dark to bright) can provide positive, real-time feedback to the user. The smart hat supports binary (e.g. on or off) or more fine grain control (e.g. volume, brightness, or temperature) in accordance with the desired implementation.

For example, suppose a wearer has the smart hat connected wirelessly with the lighting of a room (e.g., lamps, floodlights, etc.). The wearer can make a gesture on one side of the hat (e.g., a tap gesture, a swipe gesture) to turn on the light. Depending on the desired implementation, the accelerometer readings can be utilized to determine which light in the room the hat is directed to based on the orientation of the hat (e.g., the direction of the brim indicates the light to be switched on or off). Further, the smart hat can be connected to multiple IoT devices at the same time. In an example implementation, the wearer may also adjust the temperature of the room by making a gesture on another side of the hat to lower or increase the temperature when the hat is connected to the thermostat.

In another example implementation, the smart hat can facilitate gesture control of personal devices. People carry and interact with an increasing number of Internet connected personal devices. A smart hat could provide an additional "hands free" method for interacting with these devices. For example, the smart hat could enable a cook to pause music that they are listening to, have a conversation on their smart phone, and then resume listening to their music without contaminating food they are preparing. Similarly, an auto mechanic might dismiss an alert from his smart watch without removing his soiled gloves. An artist might be drawing on a tablet computer when an alert is displayed by the tablets OS. Rather than stopping mid-sketch, the artist could simply nod their head or make other head gestures (e.g., shake, turn) to dismiss the alert and then continue working uninterrupted. For example, suppose the wearer of the smart hat is busy with another activity and the phone begins to ring. If the wearer does not have their hands free to interact with the mobile device, the wearer can make a nodding gesture with their head to answer the call, and then shake their head to hang up. The gestures can be changed and implemented in accordance with the desired implementation.

In another example implementation, the smart hat can facilitate remote control of public displays. The rise of Internet connected personal devices is mirrored by the rise of interactive public displays. These displays are increasingly found in malls, museums, and other public spaces. While many of these displays currently utilize touch interaction, in-air gestures, or interaction through a mobile device, connected wearables may make interaction with public displays more natural and socially acceptable. Rather than touching a potentially dirty public display, making a conspicuous in-air gesture, or pausing to take out their mobile device, an onlooker can quickly and discreetly engage with the display using their hat. For example, suppose the wearer approaches a 360 display. The wearer can rotate the hat to pan the display in the respective directions. The wearer can also lift the brim upwards to zoom in and pull the brim downwards to zoom out. Further, the LEDs on the outside of the crown can be lit up to signal how many displays were visited by the wearer, depending on the desired implementation.

In an example implementation, the smart hat can facilitate ambient and peripheral notifications. Nearly all wearable and mobile devices afford user notifications; however, these notifications are often disruptive, using vibration, sound, or distracting flashes of light to alert the user. Thus, these notifications may not be well suited to many situations in which the user needs to remain focused on the task at hand. Furthermore, some settings such as factories or loud concerts render these types of notifications ineffective. The smart hat is capable of delivering ambient notifications in the user's peripheral vision, allowing them to continue their work without distraction, and persisting in noisy environments. A smart surgical cap could notify a surgeon of patient biometrics without having to avert their gaze. A smart bicycle helmet could notify a cyclist of an upcoming detour without distracting them from the road. A concert-goer could receive text alerts on their smart hat, unable to feel the vibration of their phone over the vibration of the bass.

In an example implementation, a worker in a factory is assembling electronics and wearing the smart hat device. Their workstation has a large display and a camera recognition system for monitoring their work. The camera system recognizes that the worker has begun to assemble a particularly tricky piece of hardware. The display updates to showcase a diagram pertinent to this task in particular. The worker does not appear to have noticed the updated display, so the system sends a message to the smart hat, which turns on the ambient under-brim display. The worker notices the ambient display in their peripheral vision and glances up at the updated diagram. When they are finished, the user quickly shakes their head to turn off the under-brim display.

In an example implementation of the smart hat, the smart hat can include embedded LEDs, an accelerometer, a power source (e.g., a battery), and electronics facilitating capacitive touch sensing, all wired to a microcontroller embedded on the hat. The microcontroller can communicate wirelessly (via Bluetooth, ultrasonics, or other protocol) with a remote base station (e.g., phone, computer, or other device). FIGS. 4(a) and 4(b) illustrate a diagram of the smart hat, in accordance with an example implementation. In addition to the shown components, the hat also includes a microcontroller, wireless communication capabilities, a battery, and electronics enabling capacitive touch sensing. Components not shown but described herein can be sewn into the sweatband or enclosed in the brim depending on the desired implementation.

In an example configuration of the smart hat, the accelerometer is embedded in the brim of the cap. The other electronics are sewn into the sweatband, or embedded in the brim. While the description and images described herein depict a baseball cap, example implementations can be implemented in other types of hats as well, including hard hats, surgical caps, helmets, sun hats, and so on. The wearable device can also include two visual displays: one on the underside of the brim configured for viewing by the wearer, and another on the crown of the cap configured to be seen by others. Such visual displays can involve embedded Red Green Blue (RGB) LEDs configured to display any number colors, patterns, and intensities in accordance with the desired implementation.

FIGS. 5(a) to 5(c) illustrate examples of touch sensitive areas of the smart hat, in accordance with an example implementation. As illustrated in FIGS. 5(a) to 5(c) the shaded areas indicate the areas of the crown that can be touch sensitive, wherein FIGS. 5(a) to 5(c) illustrate different perspective views. In the example of FIGS. 5(a) to 5(c), the left and right sides of the crown are configured to detect taps, presses (e.g., in which the touch is held for a period of time), and swipes (e.g., in four directions: up, down, left, right). However, other implementations are also possible and the present disclosure is not limited thereto. For example, the touch sensitive regions can be utilized to detect more complex gestures such as drawing shapes (e.g., circle, triangle, square, checkmark, letters, and so on) in accordance with the desired implementation. The button on top of the cap is configured to detect taps and presses. These areas of the hat use conductive materials such as fabrics and threads to facilitate capacitive touch sensing. The accelerometer is capable of detecting head movements and gestures such as shaking the head, nodding the head, and looking in specific directions. It is also capable of detecting gestures with the hat, such as lifting it off the head, turning it on the head, and taps on the brim in accordance with the desired implementation.

FIGS. 6(a) and 6(b) illustrate an example configuration of ambient output modalities, in accordance with an example implementation. In an example configuration, there can be two sets of LEDs on the underside of the brim. The first set can be angled such that they project light onto the entire underside of the brim as illustrated in FIG. 6(a). The second set can be situated at the front of the brim and project light in front of the hat, onto the wearers workspace as illustrated in FIG. 6(b). Although example implementations illustrated herein illustrate a configuration involving a baseball cap with four RGB LEDs embedded in the underside of the brim, other hat forms can also be utilized, and any number of RGB LEDs can be utilized in accordance with the desired implementation.

Figure 7:
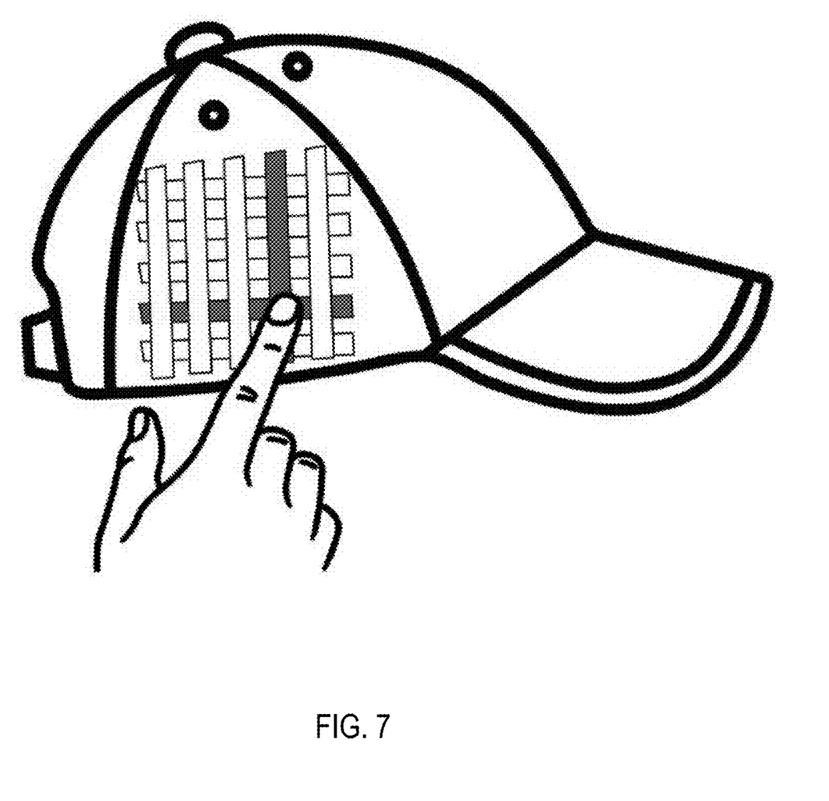
FIG. 7 illustrates an example facilitation of capacitive touch sensing, in accordance with an example implementation.

FIG. 7 illustrates an example facilitation of capacitive touch sensing, in accordance with an example implementation. As illustrated in FIG. 7, at least a portion of the crown of the hat contains multiple horizontal and vertical strips of conductive fabric interwoven therein. By detecting simultaneous changes in the resistance of both horizontal and vertical strips of conductive fabric as illustrated by the shaded sections of FIG. 7, the microcontroller (MC) can pinpoint the location of the touch and characterize complex gestures such as swipes forwards, backwards, up, and down in accordance with a desired implementation.

The LEDs of the smart hat can be wired directly to the embedded MC and controlled through digital outputs of the MC. Depending on the desired implementation, such wires can hidden, sewn into the brim. The MC can similarly be sewn into the sweatband of the cap, depending on the desired implementation. The smart hat also includes LEDs sewn into the crown of the cap, as illustrated herein.

The example implementations described herein utilize a wireless connection to connect the MC through a network interface such as a hardware serial peripheral interface (SPI) to interact with external devices/displays and apparatuses, while being wired to the elements within the smart hat. In an example configuration, the accelerometer is embedded in the brim of the cap and connected to the microcontroller using a bus such as I2C. The gesture recognizer is facilitated by the microcontroller, connected mobile device, external display, IoT device, or any other device with hardware processing power in accordance with an example implementation. The battery in the example implementations can be in the form of a rechargeable lithium ion battery that is sewn into the sweatband of the cap for easy access. The top button of the crown is constructed of conductive fabric and connected directly to the MC, which measures resistance across the button in order to detect when the button has been touched. The left and right sides of the crown each include a grid made out of strips of conductive fabric interlaced with each other as illustrated in FIG. 7. Each strip is connected directly to the MC, which measures resistance across the strips. By detecting simultaneous changes in the resistance of both horizontal and vertical strips of conductive fabric, the MC can pinpoint the location of the touch and characterize complex gestures such as swipes forwards, backwards, up, and down.

Figure 8A:
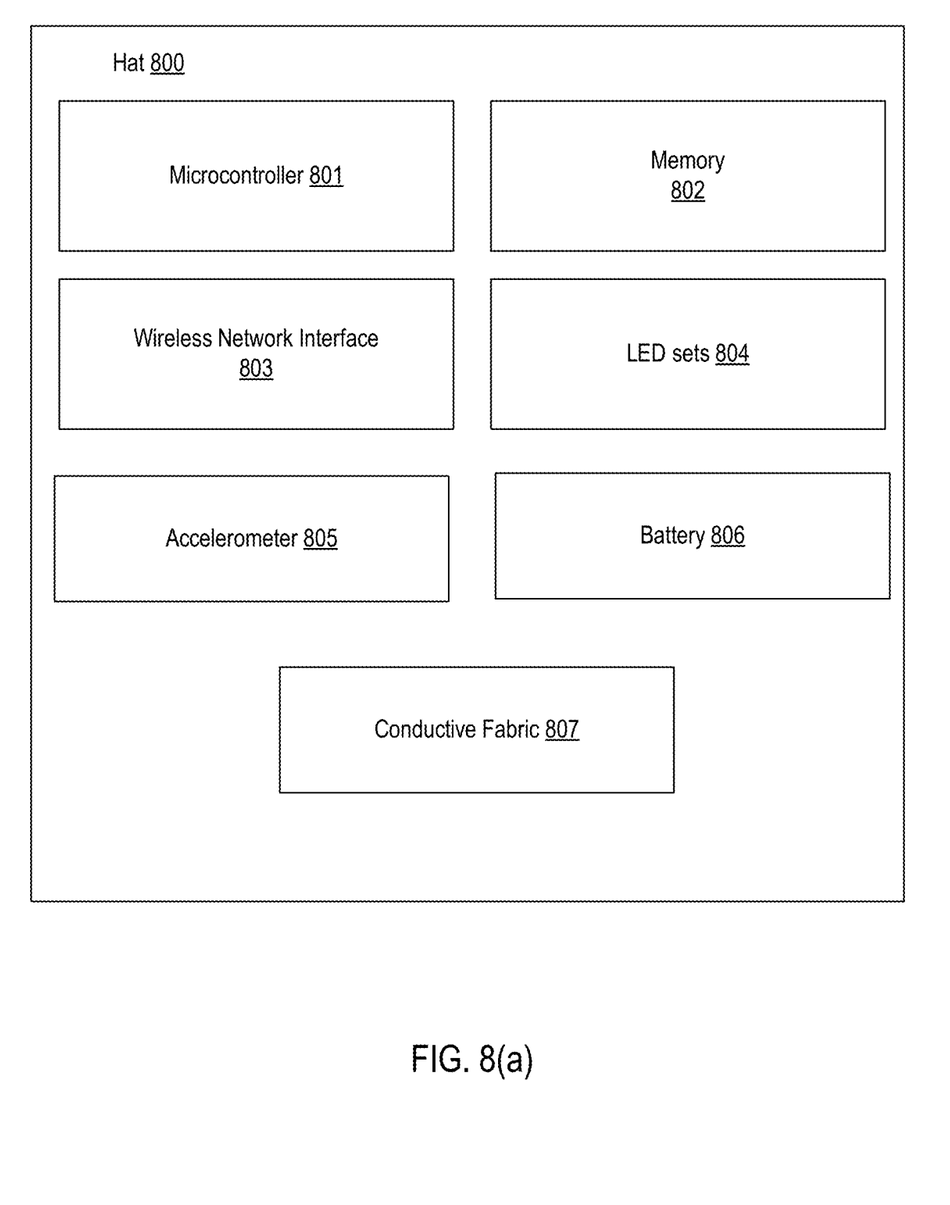
FIGS. 8(a) to 8(c) illustrates example functional diagrams of the smart hat, in accordance with an example implementation.
Figure 8B:
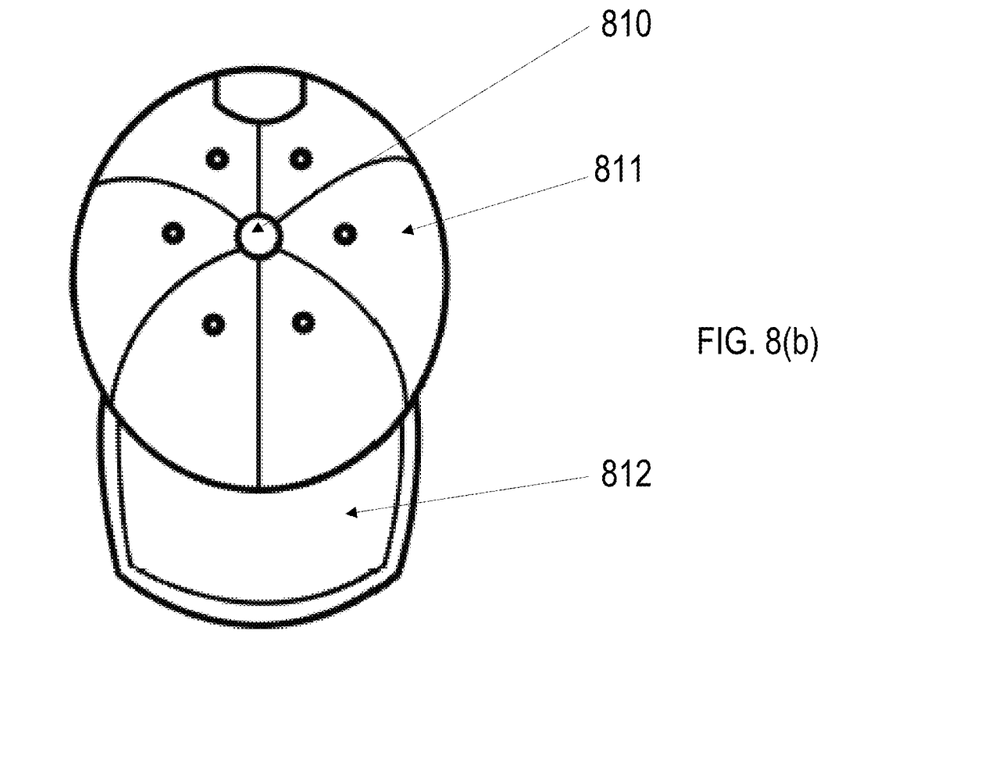
Figure 8C:
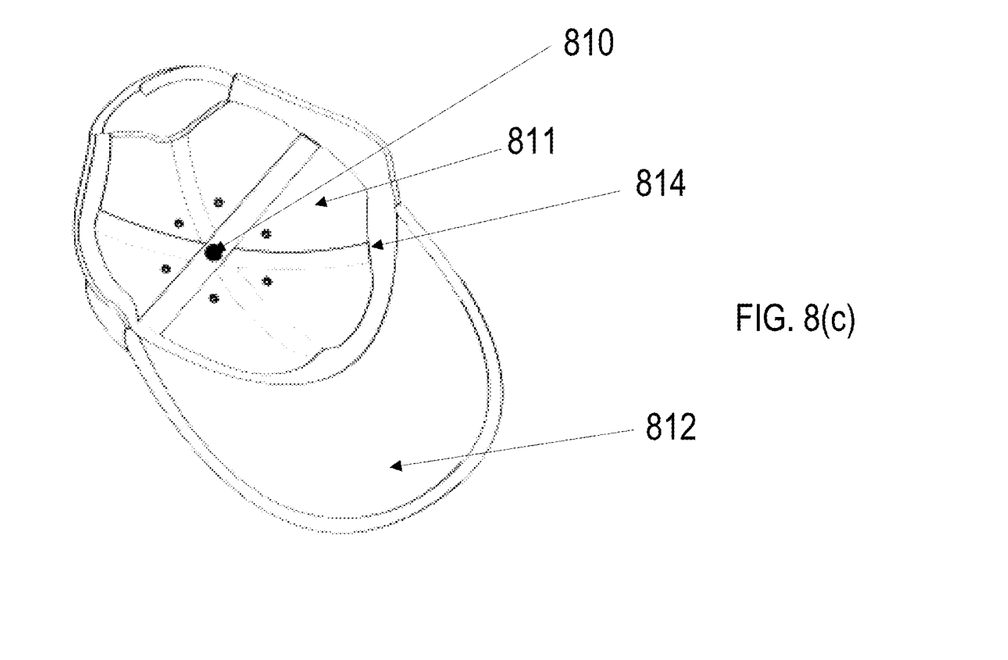

FIGS. 8(a) to 8(c) illustrates example functional diagrams of the smart hat, in accordance with an example implementation. As illustrated in the diagram of FIG. 8(a) and as described in the present disclosure, hat 800 can involve a microcontroller (MC) 801, a memory 802, a wireless network interface 803, one or more LED sets 804, an accelerometer 805, a battery 806, and conductive fabric 807. MC can be in the form of any hardware processor or dedicated programmable chip configured to facilitate the functions herein. Memory 802 can be utilized as cache for transmitting and receiving messages between the hat 800 and external devices or other hats, or can be merged with the MC 801 to facilitate the same functionality. Messages can be transmitted to external devices or other hats through the wireless network interface 803.

FIG. 8(b) illustrates a perspective view of a hat from the top side, in accordance with an example implementation. The hat can include a button 810, a crown 811, and a brim 812. FIG. 8(c) illustrates the same hat from the bottom side, in which there may also be disposed a crown lining 814 on the bottom side of the hat, which can also include conductive fabric 807 configured to detect touch events as described herein.

In example implementations there can be a hat 800 which includes a brim 812 having disposed on an underside of the brim a set of light emitting diodes (LEDs) 804 oriented to illuminate at least a portion of the bottom portion of the brim as illustrated in FIG. 6(a), a wireless network interface 803, and a MC 801, configured to: for receipt of a message over the wireless network interface 803 (e.g., and stored into memory 802), configure the set of LEDs 804 to illuminate according to at least one of a corresponding color, a brightness, or a pattern based on the message as illustrated in FIG. 1 and FIG. 6(a).

In example implementations the hat 800 can further involve an accelerometer 805 configured to measure motion; wherein the MC 801 is configured to, for recognition of a gesture from the motion measurements of the accelerometer 805, configure the set of LEDs to turn on at least one of a corresponding color, brightness, or pattern based on the gesture as illustrated in FIG. 1 and FIG. 4(a). Accelerometer 805 can be disposed on a top portion of the brim 812 as illustrated in FIG. 4(a) or in other locations depending on the desired implementation.

As illustrated in FIG. 1, FIGS. 5(a) to 5(c) and FIG. 7, the hat 800 can further involve touch sensors in the form of conductive fabric 807 interwoven in a portion of a crown 811 of the hat 800, configured to register a touch event, and the MC 801 is configured to, for classification of the touch event as a command directed to an external device, transmit a message to the external device over the wireless network interface 803. As illustrated in FIG. 7, the conductive fabric 807 can be interwoven in the portion of the crown of the hat as a plurality of horizontal strips and vertical strips interlaced in a grid form; wherein the microcontroller 801 is configured to detect a location of the touch event based on a response from at least one of the plurality of horizontal strips and the plurality of vertical strips; and recognize the gesture based on the response. However, the present disclosure is not limited thereto and other conductive material can be utilized in place of interwoven conductive fabric to facilitate the desired implementation. For example, for hats with hard surfaces such as hard hats, the touch sensors can be in the form of conductive material attached to a portion of the crown of the hat, (e.g., adhered, mechanically fastened, bonded) in accordance with the desired implementation.

As illustrated in FIG. 6(b), the brim 812 can involve another set of LEDs 804 oriented to project light in front of the hat 800 wherein the MC 801 is configured to, for receipt of the message over the wireless network interface 803 corresponding to the another set of LEDs 804, configure the set of LEDs 804 to illuminate according to at least one of the corresponding color, the brightness, or the pattern based on the message corresponding to the another set of LEDs 804 as illustrated in FIG. 6(b) and FIG. 1.

In example implementations, the button 810 that is disposed on the top portion of the crown 811 can be made of conductive fabric 807 and configured to facilitate inputs that the MC 801 can detect as tap or press touch events made on the button 810 as illustrated in FIG. 1 and FIGS. 5(a) to 5(c).

In example implementations, the hat 800 can also involve another set of LEDs 804 disposed on top of a portion of the crown 811 as illustrated in FIG. 4(a), and the MC 801 is configured to configure the another set of LEDs 804 to illuminate according to at least one of a corresponding color, a brightness, or a pattern based on a command (e.g., as directed to the hat) as illustrated in FIG. 1.

In example implementations, the message is received from an external device connected to the hat 800 by the wireless network interface 803 as illustrated in FIGS. 2 and 3, wherein the MC 801 is configured to transmit messages to the external device by the wireless network interface 803 based on a touch event made on the hat 800 as illustrated in FIG. 1.

Depending on the desired implementation, the MC 801 can also be configured to, for receipt of gesture detected by the MC 801 that is directed to turning off the LEDs 804 (e.g., in response to receipt of a message or other event), configure the set of LEDs 804 to turn off as described herein and as illustrated in FIG. 1.

Figure 9:
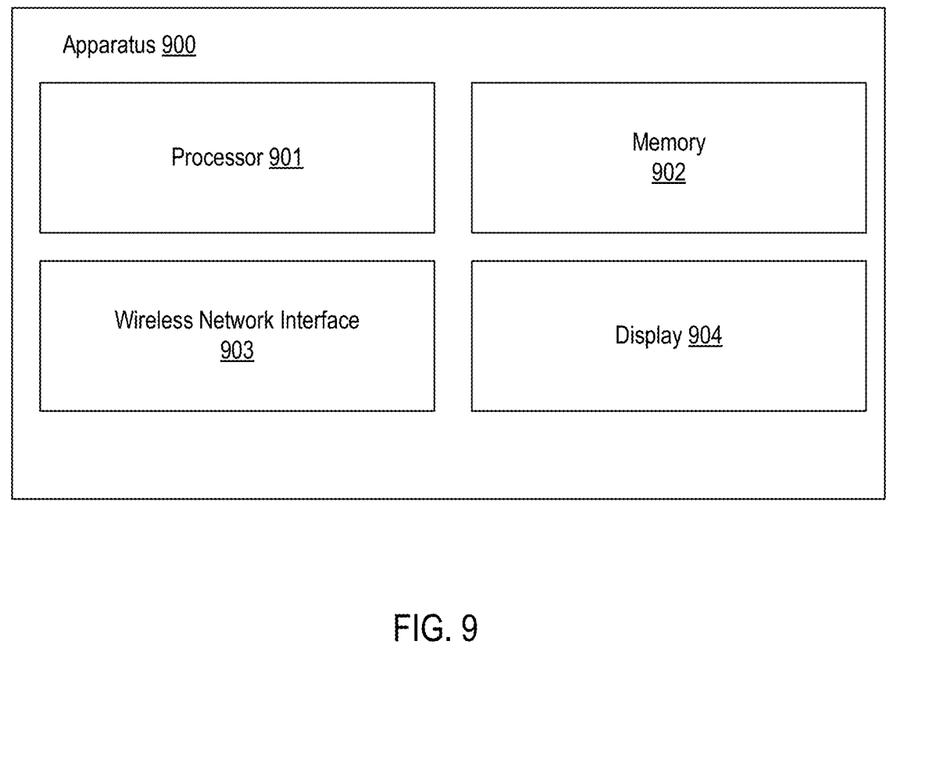
FIG. 9 illustrates an example of an external apparatus that can be connected wirelessly to the hat, in accordance with an example implementation.

FIG. 9 illustrates an example of an external apparatus 900 that can be connected wirelessly to the hat 800, in accordance with an example implementation. Apparatus 900 can be configured with a processor 901, which can be in the form of a hardware central processing unit (CPU) or some combination of hardware and software processors, a memory 902, a wireless network interface 903 and optionally, a display 904. External apparatus 900 can be in the form of a user device such as a mobile phone, a laptop, and so on, or can be an external server, a control system, an external display, a kiosk, or other external apparatus in accordance with the desired implementation. Processor 901 can be configured to transmit and receive messages to the hat 800 through wireless network interface 903. The messages can be in the form of executable commands, which can be associated with lighting up particular sets of LEDs of the hat 800 such as the set of LEDs on the top portion of the crown, the underside of the brim, or the set of LEDs configured to provide illumination in front of the hat, in accordance with the desired implementation. Processor 901 can also receive commands from the hat 800 through wireless network interface and execute the commands depending on the apparatus 900 and the desired implementation as described in the present disclosure.

Further, although example implementations described herein are directed to LED implementations, any other electroluminescent elements can be utilized instead of LEDs (e.g., light panels, illuminative wires, wave guides, etc.) to facilitate the desired implementation in accordance with the example implementations described herein. Sets of LEDs can be replaced by sets of any other electroluminescent elements to achieve the desired implementation. Other elements may also be substituted to facilitate the same functionality in accordance with the desired implementation. For example, the accelerometer may also be substituted with other sensors configured to sense motion including gyroscopes, magnetometers, motion sensors, and so on depending on the desired implementation.

Further, gestures (e.g., head gestures, touch gestures) and touch events can be configured to be associated with a command directed to the hat or directed to the external device in any manner according to the desired implementation. For example, a gesture from the motion measurements of the sensor can be interpreted as a command directed to the hat (e.g., command to configure the set of electroluminescent elements to turn on at least one of a corresponding color, brightness, or pattern based on the gesture) or as a command to an external device (e.g, to transmit a message to the external device over the wireless network interface). Touch events can similarly be associated and the hat can be configured to execute similar functions in response to touch events according to the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result.

In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A hat, comprising:
    a brim having disposed on an underside of the brim a set of electroluminescent elements angled toward the middle of the brim to illuminate at least a portion of the bottom portion of the brim;
    a wireless network interface configured to connect the hat to an external device; and
    a microcontroller, configured to:
        for receipt of messages over the wireless network interface from the external device, configure the set of electroluminescent elements to illuminate according to at least one of a corresponding color, a brightness, or a pattern for each of a plurality of content types of the messages, each content type corresponding to different configuration of illumination, and
        in response to receiving a message over the wireless network from the external device, control the set of electroluminescent elements to illuminate the at least the portion of the bottom portion of the brim, so as to provide an ambient notification, indicative of the message, that is visible to a wearer of the hat, according to the configuration for the content type of the received message.

2. The hat of claim 1, further comprising a sensor configured to measure motion of a head of the wearer of the hat;
    for recognition of a first head gesture from the motion of the head measured by the sensor as a command directed to the hat, configure the set of electroluminescent elements to turn on at least one of a corresponding color, brightness, or pattern based on the gesture; and
    for recognition of a second head gesture from the motion of the head measured by the sensor as a command directed to an external device, transmit a message to the external device over the wireless network interface.

3. The hat of claim 1, further comprising a touch sensor on a portion of a crown of the hat, configured to register a touch event;
    wherein the microcontroller is configured to:
        for classification of the touch event as a command directed to an external device, transmit a message to the external device over the wireless network interface; and
        for classification of the touch event as a command directed to an external device, configure the set of electroluminescent elements to turn on at least one of a corresponding color, brightness, or pattern based on the gesture.

4. The hat of claim 3, wherein the touch sensor is made of conductive material, and the conductive material is attached to the portion of the crown of the hat.

5. The hat of claim 4, wherein the conductive material is attached by being interwoven, adhered, mechanically fastened or bonded to the portion of the crown of the hat.

6. The hat of claim 3, wherein the touch sensor is interwoven in the portion of the crown of the hat as a plurality of horizontal strips and vertical strips interlaced in a grid form;
    wherein the microcontroller is configured to:

detect a location of the touch event based on a response from at least one of the plurality of horizontal strips and the plurality of vertical strips; and
recognize the gesture based on the response.

7. The hat of claim 1, wherein the brim further comprises another set of Electroluminescent elements oriented to project light in front of the hat;
wherein the microcontroller is configured to:
for receipt of the message over the wireless network interface corresponding to the another set of Electroluminescent elements, configure the set of Electroluminescent elements to illuminate according to at least one of the corresponding color, the brightness, or the pattern based on the message corresponding to the another set of Electroluminescent elements.

8. The hat of claim 1, further comprising a button disposed on a top portion of a crown of the hat, the button comprising conductive fabric, wherein the microcontroller is configured to detect tap or press touch events made on the button.

9. The hat of claim 1, further comprising another set of Electroluminescent elements disposed on top of a portion of a crown of a hat; wherein the microcontroller is configured to configure the another set of Electroluminescent elements to illuminate according to at least one of a corresponding color, a brightness, or a pattern based on a command.

10. The hat of claim 1, wherein the message is received from an external device connected to the hat by the wireless network interface, wherein the microcontroller is configured to transmit messages to the external device by the wireless network interface based on a touch event made on the hat or a head gesture detected by a sensor configured to measure motion.

11. The hat of claim 1, wherein the microcontroller is configured to, for receipt of gesture or a touch event detected by the microcontroller, configure the set of Electroluminescent elements to turn off.

12. The hat of claim 2, wherein the first and second head gestures are each one of shaking of the head, nodding the head, the head turning to a specific direction, lifting the hat off the head, and turning the hat while on the head.

13. The hat of claim 1, wherein the content type of the received message is a text message that is received by the external device, the microcontroller configured to, in response to receiving the text message, control the set of electroluminescent elements to illuminate the at least the portion of the bottom portion of the brim using a first color, thereby providing an ambient notification to the wearer that is indicative that the text message was received by the external device.

14. The hat of claim 1, wherein the content type of the received message is an notification that a parameter monitored by the external device does not satisfy a preset criteria, the microcontroller configured to, in response to receiving the notification, control the set of electroluminescent elements to illuminate the at least the portion of the bottom portion of the brim with flashes of light having a first color, thereby providing an ambient notification to the wearer that is indicative that the monitored parameter no longer satisfies the present criteria.

15. The hat of claim 14, wherein the notification is at least one of:
a notification that a wirelessly connected thermostat has been set above a preset threshold;
where the hat is a smart surgical hat, a notification that a patient's biometrics do not satisfy desired biometric criteria;
where the hat is a smart bicycle helmet, a notification of an upcoming detour or obstacle.

16. A system comprising:
an apparatus; and
a hat connected wirelessly to the apparatus, the hat comprising:
a brim having disposed on an underside of the brim a set of electroluminescent elements angled toward the middle of the brim to illuminate at least a portion of the bottom portion of the brim;
a wireless network interface configured to connect the hat to the apparatus; and
a microcontroller, configured to:
for receipt of messages over the wireless network interface from the external device, configure the set of electroluminescent elements to illuminate according to at least one of a corresponding color, a brightness, or a pattern for each of a plurality of content types of the messages, each type of content corresponding to different configuration of illumination, and
in response to receiving a message over the wireless network from the external device, control the set of electroluminescent elements to illuminate the at least the portion of the bottom portion of the brim, so as to provide an ambient notification, indicative of the message, that is visible to a wearer of the hat, according to the configuration for the content type of the received message.

17. The system of claim 16, the hat further comprising a sensor configured to measure motion of a head of the wearer of the hat;
wherein the microcontroller is configured to:
for recognition of a gesture from the motion of the head measured by the sensor as a command directed to the hat, configure the set of electroluminescent elements to turn on at least one of a corresponding color, brightness, or pattern based on the gesture; and
for recognition of a gesture from the motion of the head measured by the sensor as a command directed to an external device, transmit a message to the external device over the wireless network interface.

18. The system of claim 16, the hat further comprising conductive fabric interwoven in a portion of a crown of the hat, configured to register a touch event;
wherein the microcontroller is configured to:
for classification of the touch event as a command directed to the apparatus, transmit a message to the apparatus over the wireless network interface;
for classification of the touch event as a command directed to the hat, configure the set of electroluminescent elements to turn on at least one of a corresponding color, brightness, or pattern based on the gesture; and
wherein the apparatus executes the command in response to the message transmitted from the hat.

19. The system of claim 18, wherein the conductive fabric is interwoven in the portion of the crown of the hat as a plurality of horizontal strips and vertical strips interlaced in a grid form;
wherein the microcontroller is configured to:
detect a location of the touch event based on a response from at least one of the plurality of horizontal strips and the plurality of vertical strips; and
recognize the gesture based on the response.

20. The system of claim 16, wherein the brim further comprises another set of Electroluminescent elements oriented to project light in front of the hat;
wherein the microcontroller is configured to:
for receipt of the message over the wireless network interface from the apparatus corresponding to the another set of Electroluminescent elements, configure the set of Electroluminescent elements to illuminate according to at least one of the corresponding color, the brightness, or the pattern based on the message corresponding to the another set of Electroluminescent elements.

21. The system of claim 16, the hat further comprising a button disposed on a top portion of a crown of the hat, the button comprising conductive fabric, wherein the microcontroller is configured to detect tap or press touch events made on the button.

22. The system of claim 16, the hat further comprising another set of Electroluminescent elements disposed on top of a portion of a crown of a hat; wherein the microcontroller is configured to configure the another set of Electroluminescent elements to illuminate according to at least one of a corresponding color, a brightness, or a pattern based on a command.

23. The system of claim 16, wherein the microcontroller is configured to transmit messages to the apparatus by the wireless network interface based on a touch event made on the hat or a head gesture detected by a sensor configured to measure motion, wherein the apparatus is an external device.

24. The system of claim 16, wherein the microcontroller is configured to, for receipt of a gesture or a touch event detected by the microcontroller, configure the set of Electroluminescent elements to turn off.

* * * * *